(12) United States Patent
Kobana et al.

(10) Patent No.: US 8,954,238 B2
(45) Date of Patent: Feb. 10, 2015

(54) VEHICLE EMERGENCY EVACUATION DEVICE

(75) Inventors: Masumi Kobana, Fuji (JP); Kazuya Sasaki, Mishima (JP); Shinya Kawamata, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/499,056

(22) PCT Filed: Jul. 11, 2011

(86) PCT No.: PCT/JP2011/065820
§ 371 (c)(1),
(2), (4) Date: Mar. 29, 2012

(87) PCT Pub. No.: WO2013/008301
PCT Pub. Date: Jan. 17, 2013

(65) Prior Publication Data
US 2014/0114536 A1    Apr. 24, 2014

(51) Int. Cl.
| | | |
|---|---|---|
| B60T 7/12 | (2006.01) | |
| B60R 22/00 | (2006.01) | |
| A01B 69/00 | (2006.01) | |
| G06F 7/70 | (2006.01) | |
| G06F 19/00 | (2011.01) | |

(Continued)

(52) U.S. Cl.
CPC ... B60T 7/12 (2013.01); B60T 7/14 (2013.01); B60K 28/06 (2013.01); B60W 2540/26 (2013.01)
USPC ............ 701/49; 701/43; 701/7; 701/117

(58) Field of Classification Search
CPC ........................................................ B60T 7/12

USPC ............. 701/43, 49, 70, 117; 705/1; 364/424, 364/424.05
See application file for complete search history.

(56) References Cited

U.S. PATENT DOCUMENTS

| | | | | |
|---|---|---|---|---|
| 4,951,199 | A | * | 8/1990 | Whitehead ...................... 701/41 |
| 5,925,084 | A | * | 7/1999 | Gotoh et al. .................... 701/45 |

(Continued)

FOREIGN PATENT DOCUMENTS

| | | |
|---|---|---|
| JP | 3-160127 | 7/1991 |
| JP | 6-107031 | 4/1994 |

(Continued)

*Primary Examiner* — James Trammell
*Assistant Examiner* — Majdi Alsomiri
(74) *Attorney, Agent, or Firm* — Finnegan, Henderson, Farabow, Garrett & Dunner, LLP (57) ABSTRACT

An emergency evacuation device of a vehicle that executes an automatic vehicle stop control based on a command of a driver is disclosed. The emergency evacuation device comprises a driver's physiological condition estimation portion that estimates a driver's physiological condition; a driver's command input portion, operated by the driver, that receives a driver's command input and outputs a command of an execution of an automatic vehicle stop control in accordance with the command input; and an automatic vehicle stop control portion that executes the automatic vehicle stop control in response to the command from the driver's command input portion, wherein based on the driver's physiological condition estimated in the driver's physiological condition estimation portion, the structure of the driver's command input portion, for example, the arrangement of receptor(s) of the driver's command input portion receiving the command from the driver is changed.

4 Claims, 6 Drawing Sheets

(51) Int. Cl.
 *B60T 7/14* (2006.01)
 *B60K 28/06* (2006.01)

(56) References Cited

U.S. PATENT DOCUMENTS

| | | | |
|---|---|---|---|
| 7,020,544 B2* | 3/2006 | Shinada et al. | 701/1 |
| 7,164,117 B2* | 1/2007 | Breed et al. | 250/221 |
| 7,194,347 B2* | 3/2007 | Harumoto et al. | 701/45 |
| 2006/0208169 A1* | 9/2006 | Breed et al. | 250/221 |
| 2007/0192038 A1* | 8/2007 | Kameyama | 702/19 |
| 2008/0036580 A1* | 2/2008 | Breed | 340/438 |
| 2008/0154629 A1* | 6/2008 | Breed et al. | 705/1 |
| 2009/0069994 A1* | 3/2009 | Uechi et al. | 701/70 |
| 2012/0212353 A1* | 8/2012 | Fung et al. | 340/905 |

FOREIGN PATENT DOCUMENTS

| | | |
|---|---|---|
| JP | 7-76235 | 3/1995 |
| JP | 2002-85360 | 3/2002 |
| JP | 2003-61939 | 3/2003 |
| JP | 2007-331652 | 12/2007 |
| JP | 2009-048605 | 3/2009 |

* cited by examiner

VEHICLE EMERGENCY EVACUATION DEVICE

TECHNICAL FIELD

The present invention relates to an emergency evacuation device of a vehicle, such as an automobile, which device stops a vehicle automatically in a driver's emergency, and more specifically to an arrangement of a switch or a command input device operated by the driver for the execution start of an automatic vehicle stop control used in the emergency evacuation device.

BACKGROUND ART

In the field of the driving support technique for vehicles, such as automobile, there is proposed an emergency evacuation device which executes an emergency evacuation process to stop a vehicle automatically during the driving of the vehicle irrespective of a braking operation of a driver (an operation of a brake pedal, etc.) when the continuation of its driving becomes difficult due to a deterioration, etc. of the driver's body condition. For example, in the patent document 1, it is described to detect a driver's consciousness lowering (a symptom of napping) by measuring a driver's heart rate, a time period without steering, a time period without blinking, etc. (through monitoring a driver's face with a camera) and to execute an automatic vehicle stop control when the driver's consciousness lowering repeatedly occurs even if the driver is prompted to awake. In the patent document 2, it is also proposed to execute an automatic stop of a vehicle at a deceleration, set in consideration of the possibility of a collision with a frontward obstacle, when a driver's reaction is absent or dull even if a warning for awake is given at a detection of a driver's nap based on a pulse (sphygmus) change or when the driver requests by himself the automatic vehicle stop through a switch or a command input device because of feeling the difficulty in keeping the driving due to an abnormality in his/her body. Further, the patent document 3 proposes a vehicle stopping device constructed such that a driver's consciousness lowering or napping is judged by using a camera to detect if a driver's face is not directed toward the vehicle front or if driver's eyes have been closed continuously for a predetermined time, etc., or based upon a driver's heart rate and respiration rate, and then, if the driver's consciousness lowering or napping is judged, the vehicle is automatically led to and stopped at a safely stoppable site through the determination of the situation around the vehicle, the width of a roadside or a road shoulder, or the position of an obstacle with detection means, such as an on-vehicle camera, a radar sensor, a navigation system and a vehicle-to-vehicle communication. Moreover, with respect to an emergency evacuation device, in the patent document 4, it is proposed as a technique of detecting a driver's body condition deterioration, etc. during driving a vehicle, to prepare a data base which records the relation between heart rates and physiological conditions (stress, irritation, concentration, sleepiness, fatigue) in which driver's individual differences are taken into consideration, and to detect the physiological condition of the driver from the heart rate of the driver during driving and the information of the data base. In the patent documents 5, there is shown a structure in which several sites on a steering wheel are equipped with a sensor detecting a heart rate of a driver driving a vehicle. And in the Japanese patent application No. 2010-53338, the inventor of the present invention has proposed a driver diagnosis device which can detect an electroencephalogram, a heart rate, a sweat rate, a blood pressure and components in an expiration of a driver during driving to diagnose a driver's physiological condition while more finely compartmentalizing the condition by means of those detected data and information in a previously prepared data base with respect to diseases and symptoms of the driver.

PRIOR REFERENCES

Patent Documents

[Patent document 1] Japanese Patent Laid-open Publication H06-107031
[Patent document 2] Japanese Patent Laid-open Publication H07-76235
[Patent document 3] Japanese Patent Laid-open Publication 2007-331652
[Patent document 4] Japanese Patent Laid-open Publication 2003-61939
[Patent document 5] Japanese Patent Laid-open Publication 2002-85360

SUMMARY OF INVENTION

Object of the Invention

By the way, in an emergency evacuation device, there is conducted the transfer of the right to drive, i.e. the transfer of the authority to drive a vehicle from a driver to a control device at the execution of an automatic vehicle stop control as an emergency evacuation process. Thus, it should be carefully conducted to judge whether or not to execute an automatic vehicle stop control accompanied by the right to drive transfer. Then, in some emergency evacuation devices, as one manner, for example, in order to check if a detection of an abnormality or a deterioration of a driver's condition or a request for an automatic vehicle stop from a driver by himself through a switch or an command input device is not an erroneous detection or input when it is found, there is provided a structure for requesting a driver to input an intention confirmation of the permission or request, or the cancel of the execution of the automatic vehicle stop control through a switch or an command input device prior to the execution start of the automatic vehicle stop control. And, such a switch or command input device for the input of the intention confirmation for the execution of the automatic vehicle stop control should be designed so that an operation mistake or an erroneous input can be prevented.

However, if a switch or an command input device is simply designed to be difficult to operate or input for the avoidance of operation mistakes or erroneous inputs of a switch or a command input device as described above, the inputting of the intention confirmation for the execution of an automatic vehicle stop control may be delayed, and it is possible that an emergency evacuation process would become difficult to be executed when the automatic vehicle stopping is necessary, or that an emergency evacuation process would be executed unnecessarily. Further, the condition that a vehicle should be stopped automatically is usually a condition that the abnormality or deterioration of the body condition of a driver occurs so that the driver's athletic ability may be reduced, and therefore, an area or a position of a spatial region possible or easy for the driver to access, and/or, an operation possible or easy for the driver to perform may be restricted. Furthermore, such an area or a position of a spatial region possible or easy for a driver to access and/or an operation amount of the driver can vary depending upon manners of deterioration of the body condition of the driver. However, in conventional emergency evacuation devices, it is seemed that a switch or a command input device operated by a driver for the judgment of the necessity of an automatic vehicle stop control is not designed in consideration of an area or a position of a spatial region possible or easy for a driver to access, and/or an operation possible or easy for a driver to perform.

Thus, the main object of the present invention is to provide an emergency evacuation device of a vehicle, which executes an automatic vehicle stop control in response to an input by a driver himself through a switch or a command input device in a driver's emergency, with a structure of a switch or a command input device in which an area or a position of a spatial region possible or easy for the driver to access, and/or an operation possible or easy for the driver to perform are taken into account.

Further, another object of the present invention is to provide an arrangement of a switch or a command input device operated by a driver especially for the judgment of the necessity of an execution of an automatic vehicle stop control of the vehicle emergency evacuation device, while taking into account the possibility of the variation of an area or a position of a spatial region possible or easy for a driver to access depending upon a manner of a deterioration a driver's body condition.

Furthermore, the further object of the present invention is to provide an arrangement of a switch or a command input device operated by a driver in such a vehicle emergency evacuation device, in which the prompt start of an execution of an automatic vehicle stop control is possible when it is necessary.

The Means for Solving the Object

According to the present invention, the above-mentioned object is achieved by a vehicle emergency evacuation device executing an automatic vehicle stop control, which device comprises a driver's physiological condition estimation portion which estimates a driver's physiological condition; a driver's command input portion which receives a driver's command input for whether or not an automatic vehicle stop control is necessary, and, based on the command input, outputs a command of an execution start of the automatic vehicle stop control; and an automatic vehicle stop control portion which executes the automatic vehicle stop control in response to the command from the driver's command input portion, wherein a structure of the driver's command input portion is changed based on the driver's physiological condition estimated in the driver's physiological condition estimation portion. In this respect, the "automatic vehicle stop control" is a control process which decelerates and stops a vehicle irrespective of a braking operation of the driver (a depression of a brake pedal, etc.). Further, the "driver's command input for whether or not an execution of an automatic vehicle stop control is necessary" is a command, indicating a permission, a request or a cancellation of the execution start of the automatic vehicle control, given to a receptor by e.g. the driver pressing the receptor.

The above-mentioned inventive device is basically designed to be capable of stopping a vehicle automatically in accordance with an input of a driver indicating whether or not an automatic vehicle stop is necessary to the driver's command input portion (namely, a switch or an command input device) at a time when the difficulty of the continuation of driving is detected due to any reason, such as an abnormality or a deterioration of a driver's body condition or when the driver feels so. However, as already noted, in a case of a driver's body condition becoming abnormal or deteriorating, depending upon its manner, for example, whether the body condition deteriorates rapidly or spasmodically, whether an athletic ability of a part of a driver's body is reduced or not, etc., an area or a position of a spatial region possible or easy for the driver to access, and/or operations possible or easy for the driver to perform may vary. Thus, depending upon the manner of the abnormality or deterioration of the driver's body condition, if a receptor of the driver's command input portion which receives a driver's command input is put on a fixed position, the accessing of the receptor may become difficult for the driver, and also, if the operation manner to be performed as a command input is fixed, performing the operation may become difficult. Therefore, in the present invention, as described above, a driver's physiological condition is estimated by the driver's physiological condition estimation portion, and based on the estimated result, the structure of the driver's command input portion which receives the command input from the driver, for instance, the arrangement of the receptor(s) and/or the operation manner to be performed as the command input is/are changed. According to this structure, in a case of a driver's body condition being abnormal or deteriorating, the accessing to the receptor which receives the command input from the driver becomes easy, or the operation as the command input becomes easy, and thereby the appropriate judging of whether or not an automatic vehicle stop control is necessary, or the prompt execution of the control at a time when the automatic vehicle stopping is necessary will become possible.

In the above-mentioned structure, as described in the patent application No. 2010-53338, the driver's physiological condition estimation portion may be designed, for example, to detect an electroencephalogram, a heart rate, a sweat rate, a blood pressure and components in expiration of a driver, and to estimate, by using information in a previously prepared data base showing relations between those detected data and diseases or symptoms, whether or not the driver's physiological condition is normal or abnormal; whether the driver's physiological condition, when it's abnormal, deteriorates abruptly, moderately without reduction of the driver's athletic ability or moderately with the driver's athletic ability; or whether or not the driver's body condition deteriorates at a level that the inputting of a command to a receptor is not performable.

As the change of the structure of the driver's command input portion, in a case of changing the arrangement of the receptor(s) of the driver's command input portion which receives a command input by a driver's operation, typically, the receptor to which a driver gives a command input may be provided in a specific site on a steering wheel so that a driver can be easy to operate it, and its position may be changed based on the estimated result of the driver's physiological condition as listed above. More concretely, when abrupt body condition deterioration is estimated, generally, it is difficult for a driver to bring his arm up higher than the height of the heart or the driver tends to take an attitude inclining forward, and therefore, a first region on a hub of the center of a steering wheel and/or a second region on the lower part of a rim of the steering wheel may be set to function as the receptor(s). Further, when a moderate body condition deterioration without reduction of the driver's athletic ability is estimated, generally, it is expected that the grasping of the steering wheel in the usual position is possible, and therefore, a steering switch on a spoke of the steering wheel (an arbitrary switches, such as a horn switch, provided on the steering wheel) may be set to function as the receptor(s). On the other hand, when a moderate body condition deterioration but accompanied by the reduction of an athletic ability in a part of the driver's body is estimated, for example, it is considered that the steering wheel is operated by single hand, and therefore, the whole region of the rim of the steering wheel may be set to function as the receptor(s). In this regard, in order to set part(s) of the steering wheel as the receptor(s) as described above, a structure or a device which can transmit a signal when receiving a pressing force may be prepared on a region which can serve as a receptor, and it may be designed that, through the activation of a part to be made function as a receptor based on the estimated result of the driver's physiological condition, only the activated region may function as a receptor. Moreover, in order to prevent an erroneous operation or input owing to contacting the receptor by the driver without intending a command input for the necessity of an automatic vehicle stop control, the driver's command input portion may be designed to judge that a command from the driver has been inputted when the receptor receives an operation of a predetermined manner, such as pressing forces of a predetermined pattern, as the command input by the driver. In that case, the predetermined pattern may be changed based on the driver's physiological condition estimated in the driver's physiological condition estimation portion.

By the way, as already noted, an execution of an automatic vehicle stop control by the emergency evacuation device is accompanied by the right to drive transfer from a driver to a control device, and thus, at the start of the execution, a careful judgment is required. So, in an embodiment, when the driver's physiological condition estimation portion detects a deterioration of a driver's body condition, or when the driver requests an automatic vehicle stop control through the command input device, such as a predetermined switch (it may be the same as the above-mentioned receptor, or a different device), the inventive device requests the driver to input a command into the receptor of the driver's command input portion (Intention confirmation process). And then, when there is made a command input of permitting or requesting an automatic vehicle stop control, or when there is no cancelling input of an automatic vehicle stop control execution start within a predetermined time, an execution of an automatic vehicle stop control is started. However, it is possible that the driver's body condition has deteriorated at a level that the driver cannot respond to the intention confirmation process. In such a case, namely, when the driver's physiological condition has deteriorated rather than a predetermined standard condition, for example, when the driver has fallen into excessive consciousness lowering or akinesia condition, the automatic vehicle stop control portion may start an automatic vehicle stop control without execution of an intention confirmation process by the driver's command input portion, namely, irrespective of the presence or absence of a driver's command input. Thereby, even when the driver's deterioration advances extremely so that responding to an intention confirmation process is impossible, an automatic vehicle stop control will be performed.

In the above-mentioned inventive device, preferably, the automatic vehicle stop control is executed to bring a vehicle to a safely stoppable site and stop it automatically, while taking into account the situation around the vehicle, the width of a roadside or a road shoulder and the positions of obstacles with detecting means such as an on-vehicle camera, a radar sensor, a navigation system, a vehicle-to-vehicle communication, etc. In this regard, in an embodiment, further, there may be provided a camera, equipped on a side part of a vehicle, which camera can change its depression angle and capture images of a road of the front to the side of the vehicle; a camera depression angle control portion which controls the camera depression angle; and a vehicle-roadside distance calculation portion which calculates a distance from the vehicle to a roadside based on a distortion-corrected image within an image region in the image captured by the camera in which region a distortion correction determined from the camera depression angle at the time of the camera capturing the image has been executed; wherein it may be designed that the camera depression angle control portion controls the camera depression angle such that an image of a stop line can be detected in the captured image of the camera at the time of the execution start of the automatic vehicle stop control; the automatic vehicle stop control portion judges whether or not the vehicle can be stopped to the stop line based on the distance from the vehicle to the roadside calculated in the vehicle-roadside distance calculation portion and a vehicle speed, and when stopping the vehicle to the stop line is possible, the camera depression angle control portion controls the camera depression angle such that the image of the stop line always exists within the captured image of the camera during the execution of the automatic vehicle stop control, and the automatic vehicle stop control portion controls the position of the vehicle using the distance from the vehicle to the roadside calculated in the vehicle-roadside distance calculation portion and the vehicle speed. In this regard, when stopping the vehicle to the stop line is not possible, the running of the vehicle may be controlled such that the vehicle can be stopped on the roadside far ahead of the stop line in the travelling direction. Moreover, in a case that the vehicle can be stopped well before the stop line, it may be designed to stop the vehicle using the distance from the vehicle to the roadside computed by the vehicle-roadside distance calculation portion and the vehicle speed while controlling the camera depression angle so that an image of the roadside of the side of the vehicle exists in the captured image of the camera.

According to this structure, first, it becomes possible to grasp the situation of the road surface from the front to the side of a vehicle without using a wide angle lens which can capture a road surface from the front to the side of a vehicle at once or without preparing two or more cameras, and thus it becomes possible to control the travelling position of the vehicle based on the distance from the vehicle to the roadside in the term from the start of decelerating the vehicle to its stop, thereby stopping the vehicle on a more appropriate site. Moreover, in calculating the distance from a vehicle to a roadside from a captured image of a camera, a distortion of an image within the captured image can be determined with a camera depression angle. Then, advantageously, an image area to which a distortion correction of a captured image of a camera is applied based upon a camera depression angle at the time of capturing of the image of the camera is determined, and the distortion correction is applied to only the determined image area thereby reducing the calculation amount in comparison with a case of applying a distortion correction to the whole captured image of the camera.

Effect of Invention

Therefore, according to the above-mentioned present invention, there is provided a structure of a switch or an command input device in which an area or a position of a spatial region possible or easy for a driver to access and/or an operation possible or easy for a driver to perform are taken into account. Especially, by a structure in which the arrangement of a receptor which receives a command input from a driver is changed based upon an area or a position of a spatial region possible or easy for a driver to access corresponding with a manner of a deterioration of a driver's body condition, the operation for a permission, a request or a cancellation of an execution of an automatic vehicle stop control becomes easy for the driver so that it becomes possible to judge appropriately whether or not an automatic vehicle stop control is necessary and to execute promptly and appropriately an automatic vehicle stop control when the automatic vehicle stop is necessary, thereby improving the safety during driving a vehicle. Moreover, in a case of employing e.g. the manner of judging the presence of the input of a command from a driver when the receptor receives pressing force of a predetermined pattern by the driver while making the operation for an command input to an automatic vehicle stop control easy, erroneous operation or input to the receptor will be avoided, and thereby further improvement in the safety during driving a vehicle will be expected.

The other purposes and advantages of the present inventions will become clear by explanations of the following preferable embodiments of the present inventions.

BRIEF EXPLANATION OF THE DRAWINGS

FIG. 1 (A) shows in the form of a block diagram a system configuration which consists of an emergency evacuation device of a vehicle in accordance with the present invention and a group of devices related thereto. FIG. 1 (B) shows in the form of a block diagram a structure of a physiological measurement portion (driver's physiological condition estimation portion) in a driver's condition recognition ECU.

FIG. 2 (A) schematically shows an appearance of the front of a driver's seat seen from a driver. FIGS. 2 (B), (C) and (D) show an arrangement of receptors (grid like portions) at a time of detecting a moderate deterioration of a body condition without reduction of an athletic ability of a driver; an arrangement of receptors (grid like portions) at a time of detecting a moderate deterioration of a body condition with reduction of an athletic ability of a driver; and an arrangement of receptors (grid like portions) at a time of detecting an abrupt deterioration of a body condition of a driver, respectively.

FIG. 4 (A) is a side view of a vehicle schematically showing the motion of an on-vehicle camera in an execution of an automatic vehicle stop control in accordance with the present invention; FIG. 4 (B) is a schematic plan view of a vehicle showing the spatial relation among the vehicle and a stop line and white line on a roadside in an execution of an automatic vehicle stop control in accordance with the present invention; FIG. 4 (C) is a schematic drawing of an image captured by a camera when the camera is directed toward a region designated by 204a, and FIG. 4 (D) is a schematic drawing of an image captured by a camera when the camera is directed toward a region designated by 204b.

FIG. 6 (A) shows in the form of a flow chart a control process in the camera depression angle control and the automatic vehicle stop control when a vehicle can stop at a stop line. FIG. 6 (B) shows in the form of a flow chart a control process in the camera depression angle control and the automatic vehicle stop control when a vehicle can stop before a stop line.

EXPLANATIONS OF REFERENCE NUMERALS

100—Steering wheel
100a—Hub
100b—Spoke
100c—Rim
102—Arrangement area of a steering switch
104—Lower region of a rim
120—Pillar
200—Vehicle
202—On-vehicle camera for capturing image of road surface
204a, b—Image capturing area of a camera
R—Road surface
SL—Stop line
RE—Roadside white line
CL—Lane dividing line

THE BEST MODE FOR INVENTION

In the followings, the present invention is explained in detail about some preferable embodiments, referring to the attached drawings.

The vehicle's emergency evacuation device in accordance with the present invention, briefly speaking, is a device that automatically executes a process which brings and stops a vehicle adjacent to a roadside, a lane edge, etc. so as not to involve the circumferences in accordance with the detecting of a necessity of the automatic vehicle stop or a driver's request, when it becomes difficult for a driver to continue driving the vehicle due to a sudden illness or an indisposition during the driving of the vehicle (an emergency evacuation process by an automatic vehicle stop control). Especially, in this embodiment, as explained in detail later, the arrangement of receptor(s) of a driver's command input portion 70 to which a driver gives a command input for a permission, a request or a cancellation of an execution of an automatic vehicle stop control is varied in accordance with the manner of a deterioration of a driver's body condition. Hereafter, the structure and operation of the inventive emergency evacuation device are explained in detail.

(a) General Structure

A vehicle on which the vehicle's emergency evacuation device is installed may be an arbitrary vehicle, such as an automobile. On the vehicle, there are installed in usual manners a powering device that generates a braking-driving force in each wheel, a steering device, and a braking device which generates a braking force in each wheel (not shown). The powering device, braking device and steering device each may be designed to be operated by a control device (a driving control device, a braking control device, a steering control device) that changes and controls a braking-driving force or a steering angle in accordance with a command from a running control portion aside from an operation input by a driver.

Figure 1:
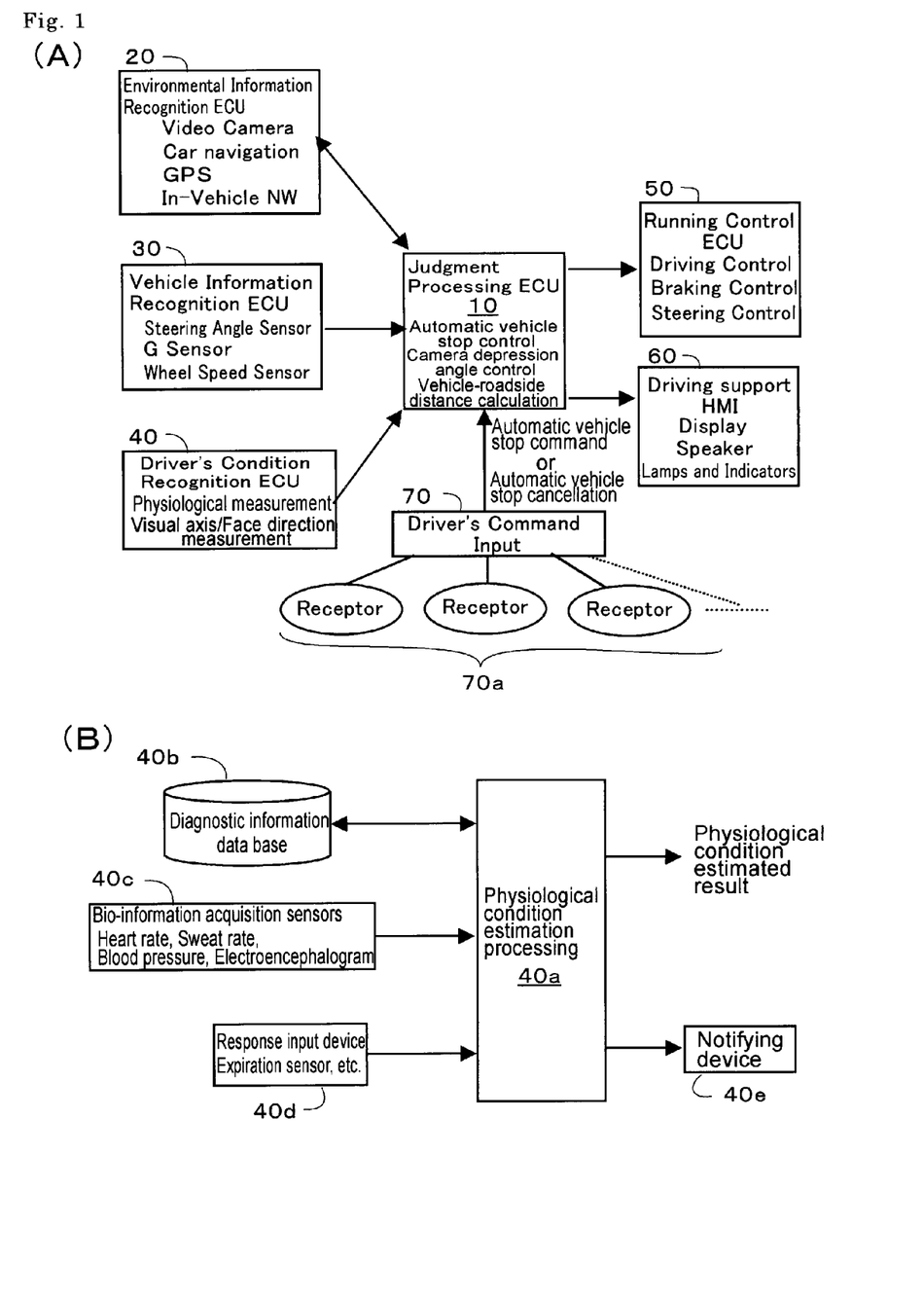

FIG. 1 (A) shows in the form of a block diagram a system configuration of the vehicle's emergency evacuation device and devices involved therewith. Referring to this drawing, the vehicle's emergency evacuation device 10 (Judgment processing ECU) judges the presence or absence of the necessity for an emergency evacuation process based on information or data from a driver's condition recognition portion 40 (driver's condition recognition ECU) for monitoring the condition of a driver, such as a deterioration of the body condition and the presence or absence of a consciousness lowering. Then, when it is judged that the emergency evacuation process is necessary, in order to decelerate and stop on a safely stoppable site the vehicle, using information or data from an environmental information recognition portion 20 (environmental information recognition ECU) for detecting the situation around the vehicle and a vehicle information recognition portion 30 (vehicle information recognition portion ECU) for detecting the running condition of the vehicle, the emergency evacuation device 10 sends a command to a running control portion 50 (running control ECU) which performs a braking-driving control and a steering control of the vehicle, while operating each portion of a driving support HMI (Human Interface) 60 which performs a various notice for making a driver, a riding person or other vehicle around the vehicle recognize the existence of the necessity of the emergency evacuation control process and its execution. In this regard, as already noted, the emergency evacuation control process in accordance with the automatic vehicle stop control as described above includes the process of transferring the right to drive a vehicle from the driver to the electronic control device, and therefore, principally, the judgment of whether to execute this emergency evacuation process should be carefully done, after conducting a driver's intention confirmation. Thus, in the above-mentioned structure, when an emergency evacuation process is judged necessary, the judgment processing ECU uses an indication on a display or a sound from a speaker of the driving support HMI to request the driver to give a receptor 70a of the driver's command input portion 70 an command input for the permission or the reconfirmation of the request (the command for automatic vehicle stop) or the cancelling (the command for cancelling automatic vehicle stop) of the execution of the emergency evacuation process. (The receptor of the driver's command input portion 70 may be used also as a command input means for a case that a driver requests an automatic vehicle stop control irrespective of the estimated result of the physiological condition by the driver condition recognition portion 40. In that case also, the judgment processing ECU uses an indication on a display or a sound from a speaker of the driving support HMI to request the driver to give the receptor 70a of the driver's command input portion 70 an command input for the permission or the reconfirmation of the request (the command for automatic vehicle stop) or the cancelling (the command for cancelling automatic vehicle stop) of the execution of the emergency evacuation process.) Then, in accordance with the driver's response to the intention confirmation process, the judgment of whether or not to execute an emergency evacuation process is made in the manner explained in detail later, and when the execution of an emergency evacuation process is determined, the automatic vehicle stop control is executed.

Each of the above-mentioned ECUs may include a microcomputer of a usual form having CPU, ROM, RAM and input/output port device, and a drive circuit, mutually connected with bidirectional common bus. The processing operations in the respective ECUs explained below are realized by operations according to computer programs of the respective ECUs.

(b) Physiological Measurement Portion (Driver's Physiological Condition Estimation Portion)

As noted above, the physiological measurement portion monitors a driver's body condition during driving a vehicle, and detects a deterioration of the driver's body condition or a consciousness lowering. Especially, in this embodiment, as already noted, the arrangement of the receptors 70a of the driver's command input portion 70 is changed, depending upon the manner of a deterioration of the driver's body condition. So, in the physiological measurement portion equipped in this invention, not only the detection of whether or not the driver's body condition deteriorates but also the detection of how the body condition is when the driver's body condition has deteriorated will be conducted.

The basic structure of the physiological measurement portion of the driver's condition recognition ECU 40 in the inventive device shown in FIG. 1 (B) may be similar to an arbitrary device which can detect an electroencephalogram, a heart rate, a sweat rate a blood pressure and/or components in expiration of a driver, and detect how the body condition of the driver is, as a driver diagnosis device described in the patent application No. 2010-53338. Concretely, referring to FIG. 1 (B), in the physiological measurement portion, first, bio-information acquisition sensors 40c, such as a brain wave sensor, a heart rate sensor, a sweat rate sensor and a blood pressure sensor are appropriately equipped so as to measure, in real time, values of an electroencephalogram, a heart rate, a sweat rate, and a blood pressure of the driver, etc., and those measured values are sequentially inputted to a physiological condition estimation processing portion 40a (which may be a microcomputer of a usual form having CPU, ROM, RAM and input/output port device, and a drive circuit, mutually connected with bidirectional common bus). Further, the physiological condition estimation processing portion 40a may be designed to use a notifying device 40e to periodically request a driver to blow expiration onto a response input device 40d, such as an expiration sensor, and thereby a response time of the driver to the request and/or the content amount or ratio of a arbitrarily selected component in a driver's expiration are measured. Moreover, the physiological condition estimation processing portion 40a is designed to be capable of communicating mutually with a diagnostic information data base 40b storing information about diseases and symptoms to acquire information necessary for the judgment of the physiological condition of body condition of a driver from the diagnostic information data base 40b. In this regard, the diagnostic information data base 40b may store not only general information about diseases and symptoms but also individual information of a driver about his past and/or present diseases and symptom.

Then, in the physiological condition estimation processing portion 40a, by comparing the respective detected values sequentially inputted from the bio-information acquisition sensor 40c and/or response input device 40d and their changes with information acquired from the diagnostic information data base 40b, the present physiological condition of the driver during driving the vehicle is sequentially estimated. In this time, the driver's physiological condition may be estimated while classified into several categories in accordance with the level or manner of a deterioration of the body condition. Concretely, depending upon the manners, the driver's physiological condition may be classified into, for example, (i) Normal condition;
(ii) Condition that the deterioration of the body condition (for example, muscular relaxation, a hypertonia) is advancing moderately;
(iii) Condition that the deterioration of the body condition (for example, muscular relaxation, a hypertonia) is advancing moderately with the reduction of the athletic ability in a part of the body;
(iv) Condition that the deterioration of the body condition (for example, muscular relaxation) is advancing abruptly;
(v) Condition that the deterioration of the body condition (for example, muscular relaxation) is advancing abruptly accompanied by a consciousness lowering or a consciousness loss. And the estimated result of the physiological condition is received in the judgment processing ECU, and used in real time for the judgment of whether to execute an emergency evacuation process.

In this regard, the above-mentioned parameters indicating the driver's physiological conditions used in the physiological condition estimation may be parameters other than the above-illustrated detected values. For instance, as a parameter indicating a driver's physiological condition, the visual axis, the change of the face direction, etc. of a driver may be taken into account. Further, the estimated physiological condition may be classified into categories other than the above-mentioned examples.

(c) Arrangement of Receptor(s) of the Driver's Command Input Portion 70

As described above, as the result of the monitoring of the physiological condition of the driver by the physiological measurement portion, when it is found that the driver's physiological condition becomes a deteriorated condition, e.g. either of the above conditions (ii)-(v), preferably, an automatic vehicle stop control is executed as an emergency evacuation process. Also when the driver requests an emergency evacuation process through the receptor of the driver's command input portion 70 or other switches of a command input device because of being aware of an abnormality of the body condition irrespective of the result of the monitoring of the physiological condition of the driver by the physiological measurement portion, an automatic vehicle stop control may be executed. However, an automatic vehicle stop control is accompanied by the transfer of the right to drive the vehicle from the driver to the electronic control device. Thus, taking into account the safety of the vehicle, confirming the driver's intention is performed prior to the execution of the automatic vehicle stop control. This driver's intention confirmation, as already noted, may be achieved by the driver pressing in a predetermined pattern on the receptor of the driver's command input portion 70 (The reason for using the pressing of a predetermined pattern is for avoiding an erroneous input detection owing to the contacting and pressing of the receptor unintended by the driver).

In this respect, in conducting the intention confirmation of whether to execute an automatic vehicle stop control, the driver's body condition has deteriorated, and accordingly, depending upon its symptom, the area or position of the spatial region possible or easy for the driver to access may vary. That is, with reference to FIG. 2, while the area possible for a driver to access easily is the region a extending from a top pillar 120 in front of a driver's seat to lower than a steering wheel 100 when the driver's condition is a normal condition (the above-mentioned condition (i)), the area possible for a driver to access easily shrinks to the region β from the lower end of the top pillar 120 to the vicinity of the lower end of the steering wheel 100 under the condition that the deterioration of the body condition is advancing moderately (the above-mentioned condition (ii) or (iii)). Furthermore, when a driver's body condition is an abruptly deteriorating condition (the above-mentioned condition (iv)), the area possible for a driver to access easily is more shrunk to the region γ from the vicinity of a hub 100a of the steering wheel 100 to the vicinity of the central lower end of the steering wheel 100. Thus, in this embodiment, the arrangement of receptors of the driver's command input portion 70 is changed, taking into account an area possible for a driver to access in accordance with an estimated physiological condition of a driver.

Figure 2:
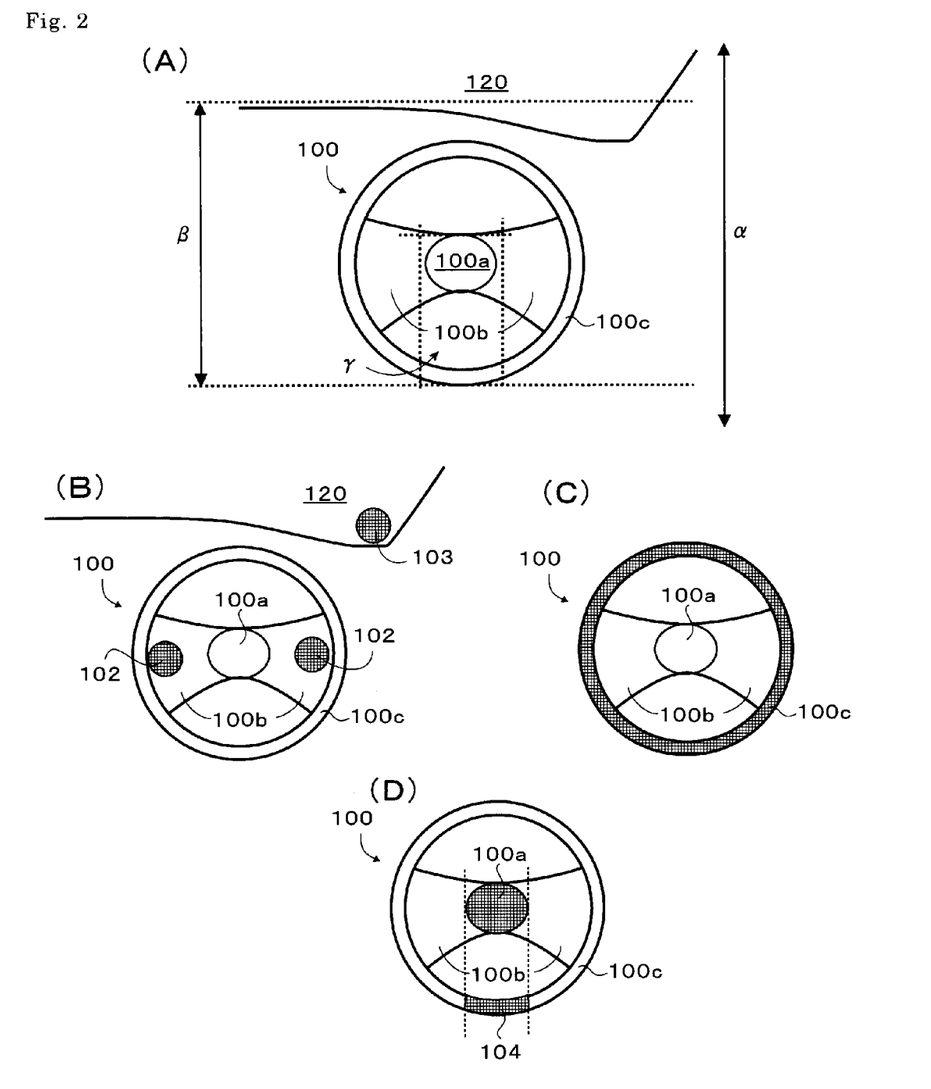

Concretely, for example, when a driver's condition is the above (ii), namely, a condition that the body condition is moderately deteriorating without reduction of an athletic ability, such as muscular relaxation, a hypertonia, etc., it is considered that the driver can access to a grid line region 102 on a spoke 100b of the steering wheel 100 or a grid line region 103 of the bottom part of the top pillar as illustrated in FIG. 2 (B) while holding the steering wheel 100 with both hands. Then, when the driver's condition is the above (ii), the grid line regions 102 and 103 in FIG. 2 (B) may be set to function as receptors of the driver's command input portion 70. In this regard, when the grid line region 102 on the spoke 100b of the steering wheel 100 is made operated as a receptor of the driver's command input portion 70, arbitrary switches (horn switch etc.), if already put on those regions, may be diverted as the receptor of the driver's command input portion 70 (In that case, the cost for receptor installation is also reduced).

Further, when a driver's condition is the above (iii), namely, a condition that the deterioration of the body condition, such as muscular relaxation and hypertonia, is advancing moderately with the reduction of an athletic ability in a part of the body, it may be considered that the athletic ability is reduced at one side of the body and the steering wheel is held with a single hand. Then, when the driver's condition is the above (iii), as illustrated in FIG. 2 (C), the whole peripheral area of the rim of the steering wheel may be set to function as a receptor of the driver's command input portion 70 so that the driver can give a command input to the receptor with only a single hand.

Furthermore, when the driver's condition is the above (iv), namely when the deterioration of the body condition, such as muscular relaxation, is advancing abruptly, the area easily accessible for a driver is made shrink to the region γ from the vicinity of a hub 100a of the steering wheel 100 to the vicinity of the central lower end of the steering wheel 100. Accordingly, when the driver's condition is the above (iv), as illustrated by the grid-like region in FIG. 2 (D), the surface of the hub 100a (the first region) and the lower part 104 of the rim 100c (the second region) may be set to function as receptors of the driver's command input portion 70. In this regard, with respect to making the lower part 104 of the rim 100c functioning as a receptor, the position of the receptor on the rim 100c changes according to a steering angle in order for the region in the lower part of the rim 100c to function as a receptor, irrespective of the steering angle of the steering wheel 100.

Under the condition of the above (v), namely, that the driver's condition deteriorates abruptly while being accompanied by a consciousness lowering or consciousness loss, an execution of an automatic vehicle stop control may be started while omitting the driver's intention confirmation process, as explained later. Therefore, in that case, there is no need to form a region functioning as a receptor. Moreover, when a driver requests an emergency evacuation process without waiting for the result of the monitoring of the physiological condition of the driver by the physiological measurement portion, the receptor that receives its command input may be provided in an arbitrary region so that an erroneous input or detection can be avoided.

As noted above, the structure for changing the arrangement of receptors for a driver's intention confirmation according to the estimated result of the driver's physiological condition may be established by previously providing the respective regions to be made a receptor with a structure or a device which can function as a receptor, and selectively activating the structure or the device of a region which should function as a receptor, namely, making the region function as a receptor in accordance with the estimated result of a driver's physiological condition. As a device which may function as a receptor and which can be selectively activated, concretely, while taking it into account that muscles can be in a relaxed condition and/or a horn should not be sounded, an arbitrary sensor such as an electrostatic sensor, a distortion sensor, an optical sensor, etc. which can transmit a signal even with a light pressing force may be employed so that a driver's command input (pressing in a predetermined pattern the region) is detectable even with a light pressing force, and these sensors may be provided on all the regions to be used as a receptor. Then, the sensor(s) of the region(s) selected in accordance with the estimated result of a driver's physiological condition is activated and made function as the receptor(s). Moreover, in an alternative manner, the driver's command input ECU may be designed to detect, as an input to the receptor, the pressing of the region selected in accordance with the estimated result of a driver's physiological condition by recognizing only the output of the receptors, such as a sensor, of the selected region.

Figure 3:
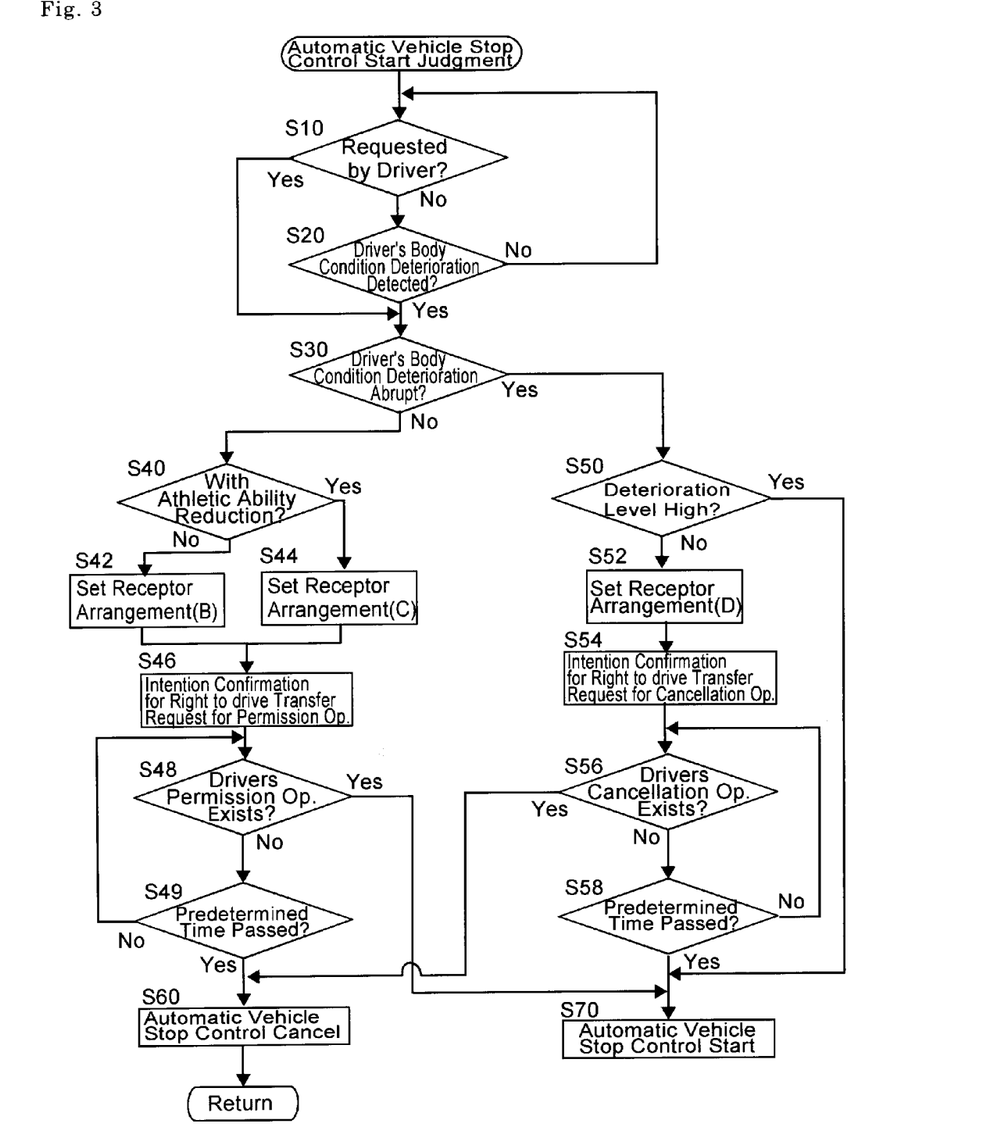
FIG. 3 shows in the form of a flow chart an embodiment of a process for the judgment of an execution start of an automatic vehicle stop control, executed in a judgment processing portion in the inventive emergency evacuation device.

(d) Judgment Process for an Execution Start of an Automatic Vehicle Stop Control Thus, the judgment of whether to start an execution of an automatic vehicle stop control in the judgment processing ECU 10 made with reference to the estimated result of the above-mentioned driver's physiological condition may be executed with the process illustrated in FIG. 3. In this respect, the process in the drawing is repetitively executed in accordance with a computer program stored in a memory of the judgment processing ECU during driving a vehicle.

Referring to FIG. 3, in the judgment process of whether to start an execution of an automatic vehicle stop control, first, there are judged whether or not the driver requests an automatic vehicle stop control through the receptor of the driver's command input portion 70 (Step 10) and whether or not the estimated result of the physiological condition of the driver by the physiological measurement portion of the driver's condition recognition ECU 40 shows the deterioration of the driver's body condition, namely, whether the estimated result of the driver's physiological condition is either of the above conditions (ii)-(v) (Step 20). Then, when it is judged that the driver requests the automatic vehicle stop control or that the estimated result of the driver's physiological condition shows the deterioration of the driver's body condition, it is judged whether the deterioration of the driver's body condition in the estimated result of the physiological condition is abrupt, (if the condition is (iv)-(v)) or moderate (if the condition is (ii)-(iii)) (Step 30).

When it is judged that the deterioration of the driver's body condition is moderate, it is judged whether or not there is a reduction of an athletic ability of the driver's body (whether the condition is (ii) or (iii)) (Step 40), and when there is no reduction of the athletic ability (when the condition is (ii)), in order to set the arrangement of the receptors as illustrated in FIG. 2 (B), the region 102 on the spoke 100b and the region 103 on the pillar are activated to function as receptors (Step 42). In this regard, here, an arbitrary switch on the spoke 100b may be diverted to function as a receptor. On the other hand, when there is a reduction of the athletic ability (when the condition is (iii)), in order to set the arrangement of the receptors as illustrated in FIG. 2 (C), the whole peripheral area of the rim 100c is activated to function as receptors (Step 44).

Then, after setting the arrangement of the receptors, using the sound from a speaker or the indication on a monitoring screen, the driver is requested to press in a predetermined pattern the receptors if he gives the permission to the execution start of an automatic vehicle stop control, namely, to conduct a permission operation for the execution start of an automatic vehicle stop control as an intention confirmation process for the right to drive transfer (Step 46). And, when it is judged that the driver has conducted the permission operation in a predetermined time in response to this request (Steps 48 and 49), the execution of the automatic vehicle stop control is started (Step 70). However, when the predetermined time passes before it is judged that the driver has conducted the permission operation (Steps 48 and 49), no automatic vehicle stop control is executed (Step 60), and, the judgment process through Steps 10 and 20 will be resumed.

On the other hand, when it is judged that the deterioration of the driver's body condition is abrupt in Step 30, it is judged whether or not the deterioration of the driver's body condition is accompanied by consciousness lowering or consciousness loss, namely, whether the condition is (v) or (iv) (Step 50). When it is estimated here that the deterioration of the driver's body condition is not accompanied by consciousness lowering or consciousness loss, in order to set the arrangement of receptors as illustrated in FIG. 2 (D), the surface of the hub 100a and the lower part region 104 of the rim 100c are activated to function as receptors (Step 52). And, using the sound from a speaker or the indication on a monitoring screen, the driver is requested to press in a predetermined pattern the receptors, namely, to conduct an operation for the cancellation of the execution start of the automatic vehicle stop control as an intention confirmation process of the right to drive transfer if the execution start of an automatic vehicle stop control is to be cancelled (Step 54). Then, when it is judged that the driver has conducted the cancellation operation in response to this request in a predetermined time (Steps 56 and 58), the cancellation of the execution of the automatic vehicle stop control is made (Step 60), and, the judgment process through Steps 10 and 20 will be resumed. On the other hand, when the predetermined time passes without judgment that the driver has conducted the cancellation operation (Steps 56 and 58), the automatic vehicle stop control is started (Step 70).

In this regard, in Step 50, when the deterioration of the driver's body condition with consciousness lowering or consciousness loss is judged (in the condition (v)), the execution of an automatic vehicle stop control may be started while omitting the intention confirmation process for the right to drive transfer.

Thus, according to the above-mentioned structure, by changing the arrangement of receptors depending upon the manner of the deterioration of a driver's body condition, the operation for a permission, a request, or a cancellation of an execution of an automatic vehicle stop control becomes easy for a driver, and thus, the intention confirmation process for whether or not an automatic vehicle stop control is necessary can be executed appropriately, so that it becomes possible to perform an automatic vehicle stop control promptly and appropriately when the automatic vehicle stop is necessary.

(e) Automatic Vehicle Stop Control and Camera Depression Angle Control

Briefly, in the automatic vehicle stop control, after the determination of an execution start of the control, a vehicle, while being decelerated, is brought to a safely stoppable site which is selected or determined, taking into account the situation around the vehicle seen by the environmental information recognition portion 20. In the determination of a safely stoppable site, more in details, by using information from a car-navigation system about the road shape or the position of a road crossing, a railroad crossing or a pedestrian crossing around the vehicle, information about the position and velocity of the other vehicle around the own vehicle acquirable through vehicle-to-vehicle communication, etc., information about the position and distance of a roadside or a road shoulder, the position and distance of an obstacle and/or the position of white line on the road surface detected by means of a video camera image or an output of a circumference recognition sensor (a radar sensor, a millimeter wave sensor, etc.), the area in which the influence of the own vehicle during decelerating and stopping on its circumference will be as small as possible is grasped, and also within this area, there is selected a site to which the vehicle can be stopped easily by the deceleration and steering from the present running conditions (a vehicle speed, acceleration and deceleration, a steering angle) of the vehicle acquired by the vehicle information recognition portion ECU. For a concrete manner of the control process, for example, the patent documents 3 or descriptions of PCT/JP2011/052289 of the inventor of the present application may be referred to.

Figure 4:
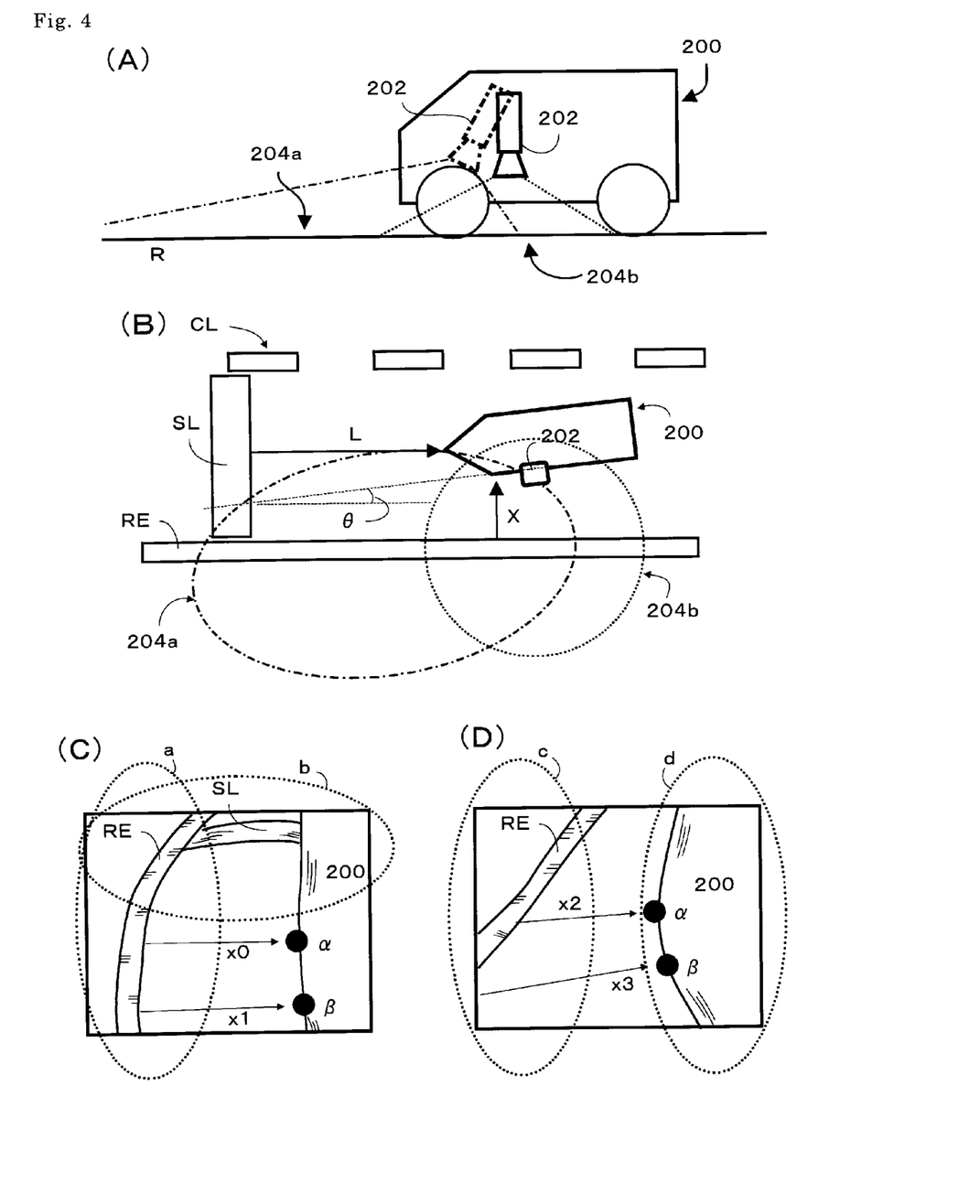

In the above-mentioned automatic vehicle stop control, in order to achieve the bringing of a vehicle to a safely stoppable site, it is preferable that the relative spatial relation or distance between the stop site or region to be targeted and a vehicle can be monitored. In this regard, since a safely stoppable site is typically in a roadside or a road shoulder, a vehicle is preferably equipped with a video camera capturing a road surface of a side of the vehicle, so that the deceleration and the steering angle of the vehicle may be controlled based on the distance from the vehicle to the roadside or the road shoulder calculated from the image captured with the video camera. Moreover, especially when it is possible that the stop site of a vehicle is close to a road crossing, a railroad crossing, etc., the vehicle have to be surely stopped before the stop line in front of such a road crossing, a railroad crossing, etc., and if it is not possible, the vehicle have to be stopped on an arbitrary safe site further beyond such a road crossing, a railroad crossing, etc. Thus, in order to grasp the position and distance of a stop line from the vehicle as correctly as possible, a video camera equipped in a vehicle is preferably capable of capturing the road surface in front of the vehicle in its travelling direction. However, in general, it is difficult to capture simultaneously with a single in-vehicle video camera from the road surface in front of a vehicle in its travelling direction to the road surface just under the side of the vehicle. Then, in this embodiment, as schematically drawn in FIG. 4 (A), a video camera (202) is equipped on the side of a vehicle 200 such that its depression angle can be variably controlled, and in selecting a safely stoppable site and bringing the vehicle to the safely stoppable site in the automatic vehicle stop control, a control of changing the camera depression angle appropriately is performed.

Moreover, in the changing of the camera depression angle, the geometric distortion of an image in a captured image changes with the camera depression angle, and thus, in calculating the distance to white line on a roadside and/or a stop line seen in a captured image, it is necessary to perform a distortion correction of the image. However, performing a distortion correction for the whole region of a captured image will make its operation amount inefficiently large. Thus, in this embodiment, an image area to which a distortion correction is applied is determined within a captured image of a camera by means of the camera depression angle at the time of the camera capturing the image, and a distortion correction is applied only to the determined area. Then, the distance from a vehicle to a roadside is computed based on the distortion-corrected image.

Figure 5:
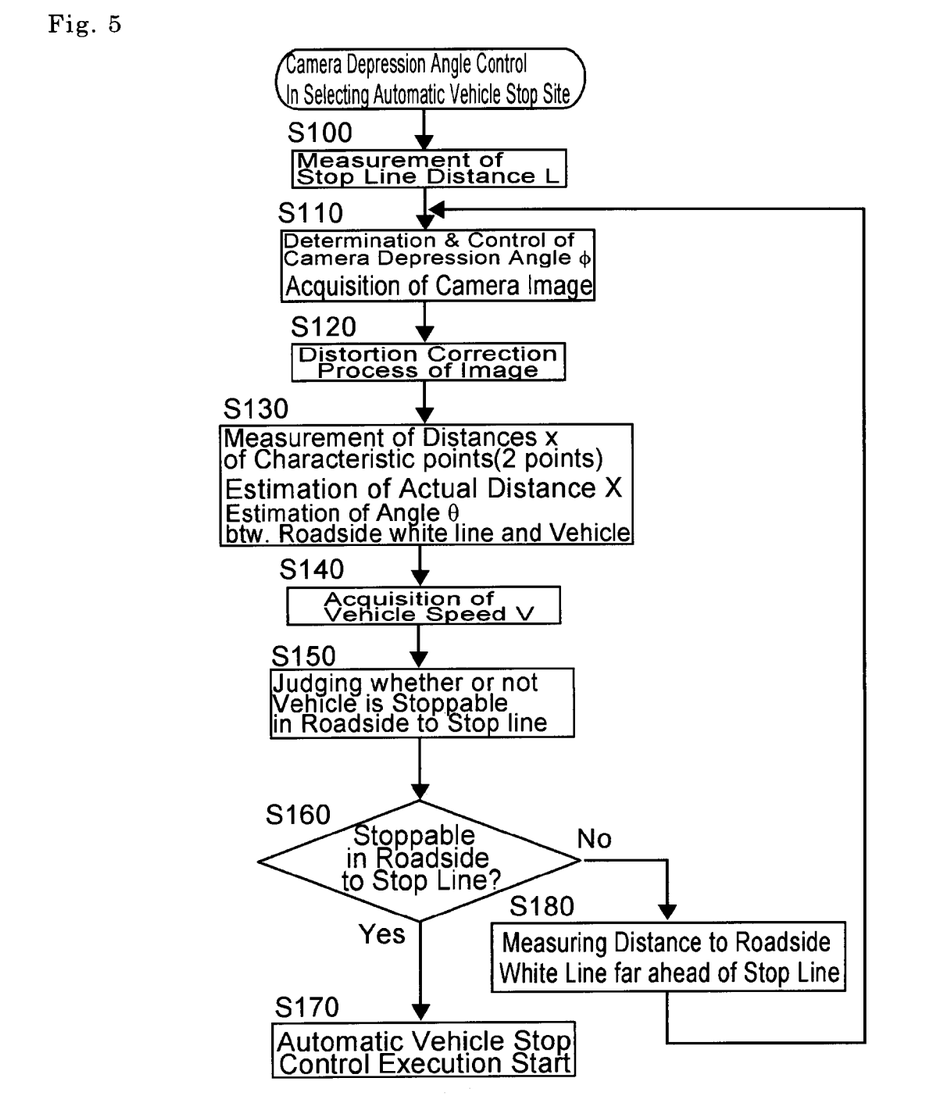
FIG. 5 shows in the form of a flow chart a process of a camera depression angle control in the selecting of an automatic vehicle stop site after the determination of the execution start of an automatic vehicle stop control in accordance with the present invention.

FIG. 5 shows an example of the process of the camera depression angle control in selecting an automatic vehicle stop site, after determining the execution start of an automatic vehicle stop control in this embodiment. Referring to the drawing, in the control, first, after determining the execution start of an automatic vehicle stop control, the stop line in front of the vehicle in its travelling direction is specified using arbitrary means, such as a car-navigation system or a vehicle-to-vehicle communication, and the distance L to the stop line is measured (Step 100). After this, while the camera 202 is directed forward as illustrated by alternate long and short dash line in FIG. 4 (A), the camera depression angle is controlled so that an image capturing area will become the region 204a containing the stop line SL, as shown in FIGS. 4 (A) and (B), and then an image is acquired (Step 110). In this regard, in the camera depression angle control, for instance, there is previously prepared a map which records a camera depression angle capable of capturing a front position of an arbitrary distance, and at the time when the distance L to the stop line SL is measured with a car-navigation system, vehicle-to-vehicle communication, etc., the actual camera depression angle may be adjusted to the camera depression angle, selected from the above-mentioned map, which angle enables capturing the position of the distance L.

Then, when a camera image is acquired, a distortion correction of the image is executed (Step 120). Generally, the distortion of an image is large in the outer periphery of an angle of view, and, when the camera depression angle is determined, the degree of distortion will also be uniquely determined. Thus, in this embodiment, as already noted, an area within the image to which area the distortion correction applies (for example, the areas a and b surrounded by dotted lines in FIG. 4 (C)) is determined with the camera depression angle at the time of capturing an image as a parameter. Then, the coordinate (x, y) of each pixel in the area to which the distortion correction applies is transformed into the coordinate (X, Y) after corrected by the following expression:

$$(X, Y) \leftarrow \tau(\phi, x, y) \cdot (x, y)$$

Here, $\tau(\phi, x, y)$ is a correction factor for the coordinate (x, y) at the camera depression angle $\phi$.

As described above, when the distortion correction of the image has been done, for example, the distance X from the vehicle to the roadside, e.g. the roadside white line RE and the angle $\theta$ between the roadside white line RE and the vehicle are estimated in the corrected image (Step 130). In this estimation calculation, for instance, first, the shortest distances x0 and x1 of characteristic points $\alpha$ and $\beta$ (see FIG. 4 (C)), arbitrarily specified on the vehicle body in the image, to the white line of the roadside are estimated, and, from these values, the distance X from the vehicle to the roadside white line RE and the angle $\theta$ between the roadside white line RE and the vehicle are computed (see FIG. 4 (B)). Also, the more accurate distance L to stop line SL may be calculated from the corrected image.

Then, when the distance X to the roadside, the angle $\theta$ against the roadside, and the distance L to the stop line SL are detected, the vehicle speed V is acquired (Step 140), and based on these values, it is judged whether the vehicle can be stopped to the stop line without performing severe deceleration and steering (Step 150). Concretely, for example, the site on which the vehicle is stopped by giving a deceleration and a steering angle allowable from the present vehicle's speed and direction is estimated, and it may be judged whether or not the estimated site is before the stop line. Here, when it is not possible to stop the vehicle at the roadside to the stop line (Step 160), a roadside or a stop line far ahead of the detected stop line SL is detected using an arbitrary means, such as a car-navigation system or a vehicle-to-vehicle communication, and Steps 110-160 are repeated. [These processes may be repeated until an appropriately stoppable site is determined.] On the other hand, when it is judged that the vehicle can stop in the roadside to the stop line, the execution of an automatic vehicle stop control is started (Step 170).

Figure 6:
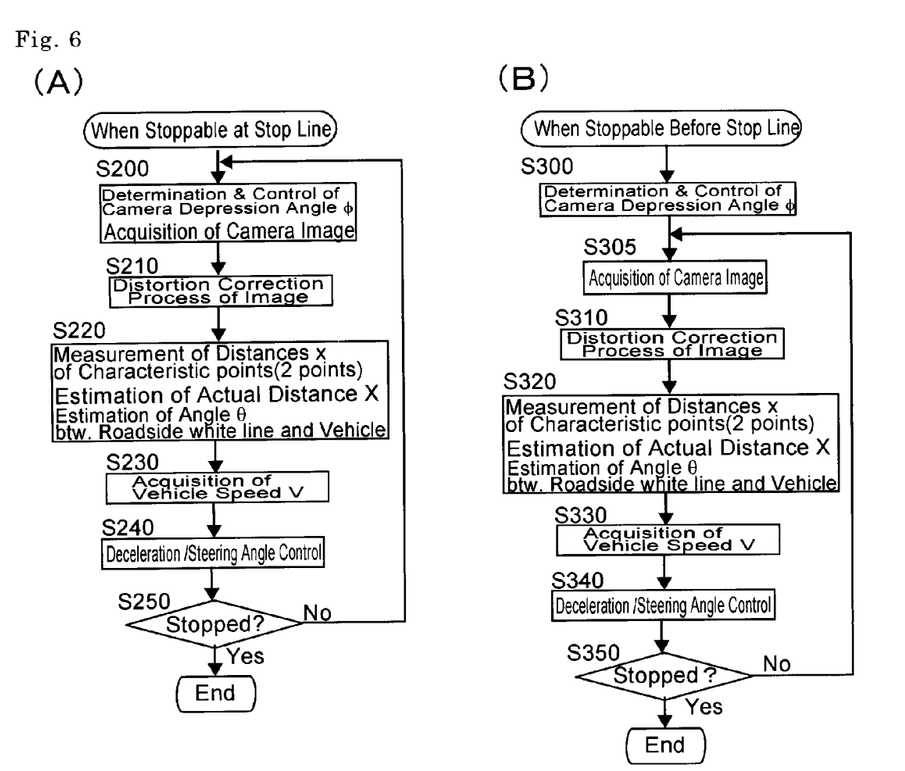

After the start of the execution of an automatic vehicle stop control, different controls for the camera depression angle may be executed, depending upon whether or not the vehicle can be stopped enough before the stop line. If the vehicle cannot stopped sufficiently before the stop line (For example, when the stopping is not possible at a predetermined distance before the stop line), the camera depression angle is controlled so that the image of the stop line SL is included in the camera image until the vehicle has been stopped. In this case, as shown in FIG. 6 (A), after the start of the execution of the automatic vehicle stop control, images are acquired while the camera depression angle is changed together with the movement of the vehicle so that the image of the stop line SL will be included in camera images (Step 200). After this, similarly to the example of FIG. 5, the distortion correction process for the image (Step 210), the estimation of the distance X to the roadside and the angle θ against the roadside (Step 220), and the acquisition of the vehicle speed V (Step 230) are executed, and using these values, the controls of the deceleration and steering angle of the vehicle are executed, respectively. The series of these controls are repeated until the vehicle stop (Step 250). According to this structure, since the position of a stop line is always monitored with images during the execution of an automatic vehicle stop control, it is avoided to stop the vehicle beyond a stop line, and thereby the safety in the vehicle stop is ensured.

On the other hand, in a case that the vehicle can be stopped sufficiently before the stop line (FIG. 6 (B)), the depression angle of the camera 202 is changed so that the vicinity of the roadside 204b of the side of a vehicle can be captured as shown by solid line in FIGS. 4 (A) and (B) after the start of execution of an automatic vehicle stop control, and thereby, as illustrated in FIG. 4 (D), the condition in the vicinity of the side lower part of the vehicle (actually, the slightly forward area is preferable) is always captured. Then, the acquisition of an image (Step 305), the distortion correction process of the image (Step 310), the estimation of the distance X to a roadside and the angle θ against the roadside (Step 320), the acquisition of the vehicle speed V (Step 330), the deceleration and steering angle control (Step 340) are repeated until the vehicle stop (Step 350). In this case, since the camera depression angle is not changed, the areas within the image to which the distortion correction is applied (For example, the area c and d in FIG. 4 (D)) will be fixed. According to this structure, since the spatial relation between the vehicle and the roadside is always monitored during the execution of an automatic vehicle stop control, the appropriate stopping along the roadside will be attained and the safety will be ensured.

Thus, according to the above-mentioned control that changes a camera depression angle appropriately, since the number of cameras used is reduced and also a lens of a wide angle becomes unnecessary to use, it is advantageous with respect to costs.

Although the above explanations have been made with respect to embodiments of the present invention, it will be apparent for those skilled in the art that various modifications and changes are possible, and that the present invention is not limited to the above-illustrated embodiments and may be applied to various devices and device without deviating from the concepts of the present invention.

For instance, in a judgment process of an execution start of an automatic vehicle stop control, the predetermined operation manner to be conducted as a command input, e.g. the pattern of a command input may be changed, depending upon whether the driver's conditions in the estimated result of physiological condition is (ii), (iii) or (iv). As an example, a structural change may be made such that it is required to press a receptor twice or more when the condition is (ii) or (iv); and it is required to press a receptor once when the condition is (iii), and thereby, as the level of the deterioration of the body condition is high, it becomes easier to give a command input for the execution of an automatic vehicle stop control.

The invention claimed is:

1. An emergency evacuation device that executes an automatic vehicle stop control of a vehicle, the device comprising:
a driver's physiological condition estimation portion that estimates a physiological condition of a driver;
a driver's command input portion that receives a command input of the driver for whether or not an execution of the automatic vehicle stop control is necessary, and outputs a command of an execution start of the automatic vehicle stop control based on the command input;
an automatic vehicle stop control portion that executes the automatic vehicle stop control in response to the command from the driver's command input portion;
wherein an arrangement of a receptor of the driver's command input portion that receives the command input by operation of the driver is changed based on the physiological condition of the driver estimated by the driver's physiological condition estimation portion, and
wherein the estimated physiological condition of the driver includes an abrupt body condition deterioration, a moderate body condition deterioration without reduction of an athletic ability of the driver a moderate body condition deterioration with reduction of an athletic ability of the driver, and wherein:
at least one of a first area in a hub of a center of wheel or a second area of a lower part of a rim function as the receptor when the abrupt body condition deterioration is estimated;
a steering switch on a spoke of the steering wheel functions as the receptor when the moderate body condition deterioration without reduction of an athletic ability of the driver is estimated; and
a whole area on the rim of the steering wheel functions as the receptor when the moderate body condition deterioration with the reduction of an athletic ability of the driver is estimated.

2. The device of claim 1, wherein the driver's command input portion judges that the command is inputted when the receptor has received pressing force of a predetermined pattern by the driver.

3. The device of claim 1, wherein, the automatic vehicle stop control portion starts an execution of the automatic stopping control, irrespective of a presence or absence of the command input of the driver when the physiological condition of the driver deteriorates beyond a predetermined reference condition.

4. The device of claim 1, further comprising a camera equipped on a side of the vehicle and having a variable depression angle and capable of capturing images of road surface from front to side of the vehicle by changing the depression angle; a camera depression angle control portion that controls the depression angle of the camera and a vehicle-roadside distance calculation portion that calculates a distance from the vehicle to a roadside based on a distortion-corrected image in an image area of the image captured by the camera to which area the distortion correction is applied, the image area being determined from the depression angle of the camera at a time of the camera capturing the image;
wherein the camera depression angle control portion controls the camera depression angle so that an image of a stop line is detected in the image captured by the camera at a time of an execution start of the automatic stopping control of the vehicle; and the automatic vehicle stop control portion judges whether or not the vehicle can be stopped to the stop line based on the distance from the vehicle to the roadside calculated in the vehicle-roadside distance calculation portion and a vehicle speed; and
wherein when the vehicle can be stopped to the stop line, the camera depression angle control portion controls the camera depression angle such that an image of the stop line always exists in the image captured by the camera during the execution of the automatic stopping control of the vehicle; and the automatic vehicle stop control portion controls a position of the vehicle using the distance from the vehicle to the roadside calculated in the vehicle-roadside distance calculation portion and the vehicle speed.

* * * * *